June 11, 1929. J. B. PARSONS 1,716,598
AUTOMOBILE STORAGE BATTERY CONTAINER
Filed Nov. 3, 1925

Joe Blackburn Parsons
INVENTOR
BY Byrus Townsend Brickenstein
ATTORNEYS

Patented June 11, 1929.

1,716,598

UNITED STATES PATENT OFFICE.

JOE BLACKBURN PARSONS, OF TORONTO, ONTARIO, CANADA, ASSIGNOR, BY MESNE ASSIGNMENTS, TO PREST-O-LITE STORAGE BATTERY CORPORATION, A CORPORATION OF INDIANA.

AUTOMOBILE STORAGE-BATTERY CONTAINER.

Application filed November 3, 1925. Serial No. 66,573.

This invention relates to improvements in battery containers particularly applicable to the storage batteries commonly carried on motor cars.

The type of battery container heretofore in general use has consisted of a wooden box containing three or more separate storage battery cells of suitable material, such as hard rubber. This type of container has been simplified and made more compact by pressing or casting the complete container with three cell compartments in one piece from a suitable acid-resistant insulating composition, but such unitary type of container is more fragile than the usual wooden box carrying separate cells and is liable to deteriorate more rapidly through vibration. Furthermore, considerable difficulty has been encountered in the use of this unitary container because the usual integral handle thereon has not been adapted to fit the different types of hold-down devices which various motor car manufacturers use to tightly clamp battery containers in the battery holders on their automobiles.

Accordingly, it is one object of this invention to provide a unitary battery container having integral durable handles so designed and reinforced by metal inserts in the hand holes thereof as to accommodate the hold-down devices supplied with practically all makes of motor cars. A further object of this invention is to further reinforce the unitary container and eliminate deterioration thereof by applying cushioning pads to the bottom of the container that rests upon the battery holder of the vehicle.

Figure 1:
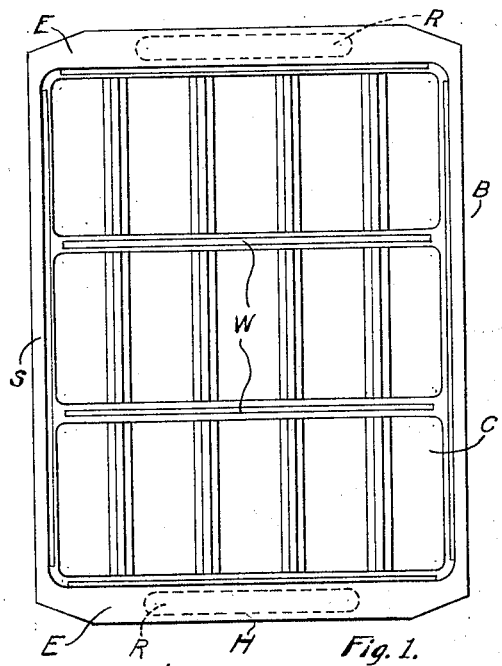
Figure 2:
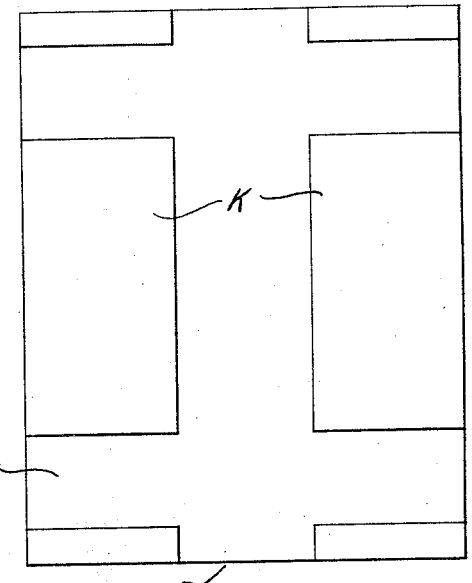
Figure 3:
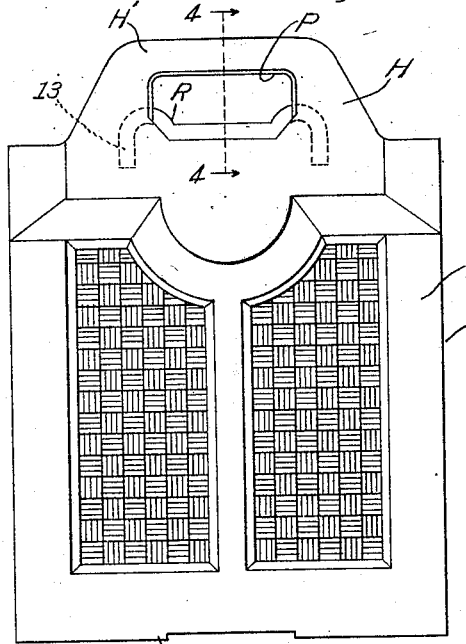
Figure 4:
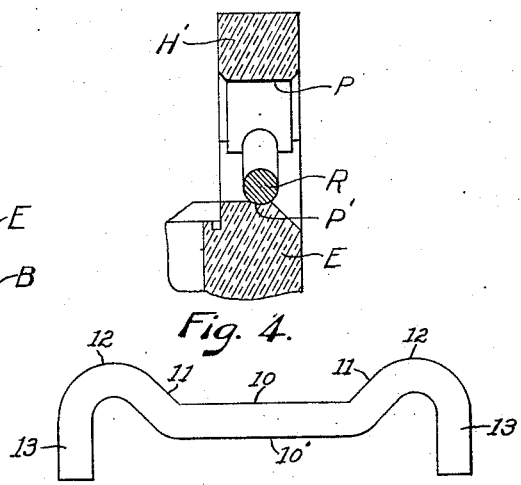
Figure 5:
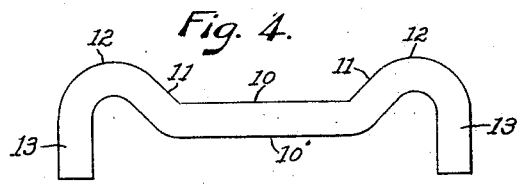

The above and other objects and the novel features of this invention will be apparent from the following description taken with the accompanying drawings, in which Figs. 1, 2 and 3 are, respectively, top, bottom and end views of the improved battery container;

Fig. 4 is a sectional view of the handle portion, taken on the line 4—4 of Fig. 3; and Fig. 5 is a view illustrating an improved metal insert for reinforcing the handle and the hand hole therein.

Referring to the drawings, the battery container B consists of a rectangular receptacle having three cell compartments C formed by intermediate walls W integrally united to the side walls S and bottom wall T. The end walls E are provided with integral arch-shaped handle portions H projecting above the upper edges of the side walls S, to which the end walls are integrally united. The handle portions H are provided with hand holes P, the lower edges P' of whcih are substantially even with the upper edges of the side walls S, sufficient thickness of the handle portion being left above the hand holes, as at H', to provide a strong hand grip. The entire container, including the handles with hand holes, are formed in one piece, as by molding the same from a suitable plastic acid-resistant insulating composition, similar to rubber.

The advantage of making the handles integral with the container has been recognized, but such handles are generally not strong enough to last under the pressure of the usual hold-down clamps. Furthermore, the bare level edges of the container and those of the hand holes generally are not of such shape as to fit some hold-down clamps in use and are not strong enough to withstand the engagement and pressure of others. In order to reinforce the handle H, and particularly the lower edge of the hand hole P thereof, suitable metal inserts R (see Fig. 5) are placed in proper position in the mold before the container is molded, whereupon the composition is placed in the mold and forced under considerable pressure to all parts of the mold, so that the inserts will be embedded in the desired location in the completed container, which is afterwards vulcanized.

The improved reinforcing insert R desirably consists of a lead-coated steel rod of circular cross section and of a diameter less than the thickness of the handle section. As shown in Fig. 5, the insert has a central horizontal portion 10 that is designed to rest upon or seat in a slight depression in the lower edge P' of the hand hole opening P. At the opposite ends of the horizontal portion 10, the insert is inclined upwardly at an acute angle, as at 11, 11. At the upper ends of the inclined portions, the insert is bent at 12, 12, and beyond these bends it has downwardly extending substantially parallel portions 13, 13. The inclined portions 11, 11 are seated on similarly inclined edges of the hand hole, so that the entire lower edge of the hand hole is reinforced by a rounded exposed non-corrodible metal edge. The ends of the insert are embedded in the handle portion H and may project into the upper portion of the end wall E, to securely hold the insert in place and to reinforce the handle and end wall. These inserts thus provide metal rims or shields for the edges of the hand holes which are subjected to pressure and wear by the usual battery hold-down devices of motor cars, and also serve as reinforcements for the integral handles at the points where they join the end walls of the container. In order to fit practically all hold-down clamps now in use, it is desirable that the exposed part be shaped as shown and that the portion 10 be approximately one and three-eighths inches long and that the portions 11, 11 shall each be about one-quarter inch long. The exposed portion of the metal should be approximately one-quarter of an inch in diameter.

In order to eliminate the vibration of the battery in its compartment on the motor car and thereby reduce battery deterioration, suitable cushions K are provided on the bottom surface T of the container B. These cushions may be in the form of separate soft rubber pads affixed at the corners and intermediate portions of the bottom, and may be about one-eighth inch in thickness, though in some instances a thicker pad is desirable, so as to take up any slight variations in the position of the inserts or hold-down clamps which cooperate with the inserts as well as with the pads. Suitable composition to form these pads, such as a composition that becomes softer upon curing than that used in forming the rest of the container, may also be placed in the mold before the container is molded. The cushions may thus be formed in one piece with the container B. Of course, the pads may be in the form of separate sheets or buttons, and may be cemented or otherwise affixed to the bottom T. If they are in the form of buttons or knobs, the rubber may be somewhat thicker.

Various changes may be made in the details of this invention without sacrificing its advantages or departing from its principles. The metal of the insert may have other dimensions and shapes and the embedded portions may be of other forms which will securely hold the inserts in place. The cushion may be attached to the entire bottom of the container or on different portions thereof, if it is symmetrically arranged so that the battery may stand firmly in its holder, and so long as it keeps the bottom of the container from direct contact with the bottom of said holder.

I claim:

1. A battery container having hand holes formed therein, and metallic rods having a horizontal portion and downwardly extending portions reinforcing the bottoms of said holes.

2. A battery container having hand holes molded therein, and metal rods having ends thereof embedded in said container and rounded intermediate portions thereof disposed on the lower edges of said holes.

3. A battery container having handle portions formed integral therewith and provided with hand holes, and metallic inserts anchored in said container and having portions disposed along edges of said holes in position to be engaged by battery hold-down devices.

4. A battery container having integral handle portions projecting above the top edges of the container walls and having hand holes, and metallic inserts having the ends thereof embedded in the end walls of said container to reinforce said handle portions and the intermediate portions thereof disposed along the lower edges of said holes and exposed to provide bearing surfaces engageable by the battery hold-down devices of an automobile.

5. A battery container formed in one piece from plastic acid-resistant insulating composition and including separate cell compartments and integral handles projecting above the top edges of said compartments and having hand holes whose lower edges are in a plane adjacent the upper edges of said compartments, metal rods having ends embedded in the container walls adjacent the ends of said handles, said rods also having inclined portions and horizontal rounded portions intermediate the latter, such inclined and horizontal portions being disposed along the lower edges of said holes and providing wear-resisting bearing surfaces for hold-down clamps.

In testimony whereof, I affix my signature.

JOE BLACKBURN PARSONS.